United States Patent
Kim et al.

(10) Patent No.: US 8,837,568 B2
(45) Date of Patent: Sep. 16, 2014

(54) METHOD OF TRANSMITTING FEEDBACK INFORMATION IN WIRELESS COMMUNICATION SYSTEM

(75) Inventors: Bong Hoe Kim, Anyang-si (KR); Dong Wook Roh, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 12/450,271

(22) PCT Filed: Jun. 19, 2008

(86) PCT No.: PCT/KR2008/003483
§ 371 (c)(1),
(2), (4) Date: Sep. 18, 2009

(87) PCT Pub. No.: WO2008/156319
PCT Pub. Date: Dec. 24, 2008

(65) Prior Publication Data
US 2010/0074316 A1      Mar. 25, 2010

(30) Foreign Application Priority Data
Jun. 19, 2007    (KR) ................. 10-2007-0060132

(51) Int. Cl.
*H04B 17/00*      (2006.01)
*H04L 1/00*       (2006.01)

(52) U.S. Cl.
CPC ............ *H04L 1/0026* (2013.01); *H04L 1/0027* (2013.01); *H04L 1/0028* (2013.01)
USPC .......................................... 375/228; 375/267

(58) Field of Classification Search
CPC ...................................... H04L 1/0026
USPC ................................... 375/228, 267
See application file for complete search history.

(56) References Cited

U.S. PATENT DOCUMENTS

| | | | |
|---|---|---|---|
| 2008/0200196 A1* | 8/2008 | Muharemovic et al. | 455/512 |
| 2008/0219370 A1* | 9/2008 | Onggosanusi et al. | 375/260 |
| 2008/0268862 A1* | 10/2008 | Kent et al. | 455/452.2 |
| 2008/0273624 A1* | 11/2008 | Kent et al. | 375/296 |
| 2009/0006925 A1* | 1/2009 | Pan | 714/758 |

FOREIGN PATENT DOCUMENTS

| | | |
|---|---|---|
| WO | WO 2006/102639 | 9/2006 |
| WO | WO 2006/130866 | 12/2006 |

* cited by examiner

*Primary Examiner* — Michael Neff
(74) *Attorney, Agent, or Firm* — Mckenna Long & Aldridge LLP

(57) ABSTRACT

A method of transmitting feedback information in a wireless communication system includes transmitting a channel quality indicator (CQI) for a first frequency band and transmitting a precoding matrix indicator (PMI) and a rank for a second frequency band that is wider than the first frequency band. Overhead incurred by transmission of feedback information such as CQI, PMI and a rank may be reduced.

5 Claims, 8 Drawing Sheets

Base station

User equipment

METHOD OF TRANSMITTING FEEDBACK INFORMATION IN WIRELESS COMMUNICATION SYSTEM

This application claims priority to Korean Application number 10-2007-0060132, filed Jun. 19, 2007 and International Application No. PCT/KR2008/003483, filed Jun. 19, 2008, all of which are hereby incorporated by reference in their entirety.

TECHNICAL FIELD

The present invention relates to wireless communication, and more specifically, to a method for transmitting feedback information in a wireless communication system.

BACKGROUND ART

Requests on information services are rapidly increased as is observed in generalization of information communication services, appearance of a variety of multimedia services, advent of high quality services, and the like. A variety of wireless communication techniques are developed in various fields to satisfy such requests.

Next generation wireless communication systems should be able to transmit high-quality high-volume multimedia data in a high speed using limited frequency resources. In order to make it possible through a radio channel with limited bandwidth, interference among symbols and frequency selective fading should be overcome while maximizing spectral efficiency. Multiple input multiple output (MIMO) is one of techniques that can improve communication capacity and performance without allocating additional frequencies or increasing power.

MIMO is a technique developed to increase capacity or improve performance using multiple antennas in a transmitter and/or a receiver of a wireless communication system. The MIMO technique does not depend on a single antenna path in order to receive one whole message, but applies a technique that gathers fragmented data segments received through multiple antennas and reproduces a message. Data transmission speed may be improved within a specific range, or a system range may be increased for a specific data transmission speed. If the number of transmit and receives antennas is increased at the same time, theoretically, channel transmission capacity is increased in proportion to the number of the antennas, and thus spectral efficiency may be improved.

The MIMO technique may be categorized into a spatial diversity method for enhancing transmission reliability using diverse channel paths and a spatial multiplexing method for improving a transmission ratio by simultaneously transmitting a plurality of data streams. Recently, studies on a method for appropriately combining these two methods to obtain adequate advantages of the methods are actively conducted.

The spatial diversity method is divided into a space-time block code (STBC) method and a space-time trellis code (STTC) method for simultaneously enhancing diversity gain and coding gain. Generally, the STTC method shows excellent performance in improving a bit error rate and has a high code creation freedom degree, whereas the STBC method has a lower operation complexity. Spatial diversity gain may be obtained as much as an amount corresponding to a multiplication of the number of transmit antennas and the number of receive antennas.

The spatial multiplexing is a method for transmitting different data streams through different transmit antennas. Since mutual interference occurs among simultaneously transmitted data streams, the receiver should process the streams after canceling the interference using a proper signal processing technique. The receiver may be divided into an ML (Maximum Likelihood) receiver, ZF (Zero-Forcing) receiver, MMSE (Minimum Mean Square Error) receiver, BLAST (Bell Labs Layered Space Time) receiver, and the like depending on a method used to cancel interferences.

When only spatial diversity gain is taken, performance improvement gain depending on increase of diversity order may be gradually saturated. When only spatial multiplexing gain is taken, transmission reliability may be lowered. Methods for obtaining both of the gains while solving the problems have been studied, which include Double-STTD, Space-Time Bit-Interleaved Coded Modulation, and the like.

On the other hand, a fading channel is one of the major causes that invite degradation of system performance of a wireless communication system. A channel gain value is changed depending on time, frequency, and space, and the performance is seriously degraded as the channel gain value is lowered. Diversity, which is one of methods capable of overcoming fading, uses the fact that probability of a plurality of independent channels to simultaneously have a low channel gain value is very low. One method of a variety of diversity methods is multi-user diversity. When there is a plurality of users in a cell, channel gain values of each users are independent from one another in probability, and thus probability of all the users to have a low gain value is very low. According to information theory, if the base station has sufficient transmission power when there is a plurality of users in a cell, total channel capacity is maximized when all channels are assigned to a user having the highest channel gain value.

The multi-user diversity may be divided into three methods. First, time multi-user diversity is a method of assigning a channel to a user having the highest gain value each time when the channel varies over time. Second, frequency multi-user diversity is a method of assigning a subcarrier to a user having the highest gain value within each frequency band in a multiple carrier system such as an OFDM (Orthogonal Frequency Division Multiplexing) system. If the channel changes very slowly in a system that does not use multiple carriers, a user having the highest gain value will exclusively use the channel for an extended period of time, and thus the other users cannot communicate. In this case, it needs to induce change of the channel in order to use the multi-user diversity. Third, spatial multi-user diversity is a method of using different channel gain values of users depending on a space, and random beamforming is an example implementing the method. The random beamforming is also referred to as opportunistic beamforming, which performs beamforming with an arbitrary weight value using multiple antennas in a transmitter to induce change of the channel.

In conventional wireless communication system, a transmitter transmits an information stream after coding the information stream using a forward error correction code so that a receiver may correct an error. The receiver demodulates a receive signal, decodes the demodulated signal using the forward error correction code, and restores the information stream.

All forward error correction codes have a maximum correction limit in correcting channel errors. That is, if a receive signal has errors exceeding the limit of a corresponding forward error correction code, the receiver cannot decode the receive signal. Accordingly, the receiver needs a criterion for determining whether there is an error in the decoded information. In addition to an error correction coding procedure, an error detection code is needed to detect errors. Generally, CRC (Cyclic Redundancy Code) is widely used as such an error detection code.

CRC is not an error correction method, but one of coding methods used for detecting errors. Generally, an information stream is coded using CRC, and a forward error correction code is applied to the CRC coded information. A unit of information stream that is coded by applying the CRC and the forward error correction code is referred to as a codeword. When a plurality of codewords are overlappingly transmitted, performance may be improved by using a receiver of an interference cancellation method.

A structure of the interference cancellation is briefly described below. A first receive signal is demodulated/decoded from the whole receive signal in which a plurality of receive signals are overlapped, and then the first receive signal is removed from the whole receive signal. A second receive signal is demodulated/decoded using the signal remaining after the first receive signal is removed from the whole receive signal. Demodulation/decoding of a third receive is performed using the signal remaining after the first and second receive signals are removed from the whole receive signal. Signals following the third receive signal are demodulated/decoded by repeating the processes described above. In order to use the interference cancellation method, the demodulated/decoded signals extracted from the receive signal should not have an error. If there is an error, an error propagation phenomenon occurs which subsequently gives negative affects when all signals thereafter are demodulated/decoded.

The interference cancellation technique may be also used in the multiple antenna technique. In order to use such an interference cancellation technique, a plurality of codewords should be overlappingly transmitted throughout multiple antennas. That is, when the spatial multiplexing technique is used, the interference cancellation technique may be used while detecting each codeword.

However, as described above, in order to minimize the error propagation phenomenon that occurs when interference is cancelled, it is determined whether there is an error in the extracted demodulated/decoded signals, and then interference should be selectively canceled. CRC described above is a practical means for determining whether there is an error in the transmitted information. Generally, a unit of information that passes through the CRC coding and is distinguished from the other information may be referred to as a codeword. That is, there should be several pieces of transmission information and a plurality of codewords in order to use the interference cancellation technique.

There is a variety of feedback information needed to efficiently operate the MIMO system.

First, a receiver should inform a transmitter of information on channel quality. A channel quality indicator (CQI) represents information on the channel quality. The CQI may be transmitted in various format. For example, the CQI may be in the form of signal-to-interference plus noise (SINR), modulation and coding scheme (MCS), and the like. The MCS includes a modulation scheme and a coding scheme. It is general that at least one CQI is needed per codeword. As the number of needed CQIs is increased since the MIMO system uses multiple channels through multiple antennas, that of codewords is increased. Accordingly, the amount of feedback information is increased in proportion to the CQI.

Second, since the MIMO system can transmit multiple data stream, feedback information for informing how many independent data streams can be transmitted at the current moment of transmission should be transmitted. This is referred to as a rank. Generally, the rank is the number of available data streams (or codewords) that can be transmitted at a moment of transmission. Since one CQI is transmitted per codeword, two CQI is transmitted at rank=2. The rank is determined depending on a combination of transmit and receive antennas. In a system having M transmit antennas and N receive antennas, the maximum rank is min(M, N).

Third, in a MIMO system that uses precoding, feedback information needs to includes information on a precoding matrix that is most appropriate to the current channel state. Although a precoding matrix described here, it can be a vector form as well as a matrix form. A precoding matrix indicator (PMI) represents an index of the selected precoding matrix from a codebook which includes a plurality of precoding matrix.

As described above, when the number of codewords is increased in the MIMO system, the number of CQIs is proportionally increased. If one CQI is configured with five bits and there are two codewords, total CQIs are configured with ten bits. Since every user who should inform a channel state transmits the CQI, the CQI occupies a large portion from the view point of total radio resources. Accordingly, it is desirable to reduce the amount of feedback information. Furthermore, since the CQI has a different value for each subband, in a system that uses frequency selective channel scheduling such as an orthogonal frequency division multiple access (OFDMA) system, the amount of CQIs may be greatly increased.

The maximum rank is four if four transmit antennas is considered. Accordingly, two information bits are needed to transmit the rank. In the case the PMI, if the codebook has N precoding matrixes, $\log_2(N)$ information bits are needed to transmit the PMI. Considering the frequency selective channel scheduling, since the PMI may be different for each subband, the amount of radio resources for the PMI may be huge.

A large amount of feedback information needs to operate a MIMO system. This means that a large amount of radio resources is allocated to a uplink control channel or a uplink data channel to transmit the feedback information.

DISCLOSURE OF INVENTION

Technical Problem

A method is sought for efficiently transmitting feedback information in a wireless communication system.

Technical Solution

In an aspect, a method of transmitting feedback information in a wireless communication system is provided. The method includes transmitting a channel quality indicator (CQI) for a first frequency band and transmitting a precoding matrix indicator (PMI) and a rank for a second frequency band that is wider than the first frequency band.

The frequency band can include at least one subband and the second frequency band can include a plurality of subbands. The first frequency band can be one subband or at least one subband selected from the second frequency band.

In another aspect, a method of transmitting feedback information in a wireless communication system is provided. The method includes transmitting a rank on a plurality of subbands at a first transmission interval, transmitting a PMI at a second transmission interval, the PMI being selected from a codebook assuming transmission on the plurality of subbands and transmitting a CQI for at least one selected subband from a subset of the plurality of subbands at a third transmission interval.

Advantageous Effects

Overhead incurred by transmission of feedback information such as CQI, PMI and a rank may be reduced.

MODE FOR THE INVENTION

A wireless communication system may be based on OFDM (Orthogonal Frequency Division Multiplexing). OFDM uses a plurality of orthogonal subcarriers. OFDM uses the orthogonality between IFFT (Inverse Fast Fourier Transform) and FFT (Fast Fourier Transform). A transmitter transmits data by performing IFFT on the data. A receiver restores original data by performing FFT on a received signal. The transmitter uses IFFT to combine multiple subcarriers, and the receiver uses corresponding FFT to separate the multiple subcarriers. According to OFDM, complexity of the receiver may be lowered in a frequency selective fading environment of wideband channels, and spectral efficiency may be enhanced through selective scheduling or the like in a frequency domain by utilizing different channel characteristics of subcarriers. OFDMA (Orthogonal Frequency Division Multiple Access) is a multiple access scheme based on OFDM. According to OFDMA, efficiency of radio resources may be enhanced by assigning different subcarriers to multiple users.

Figure 1:
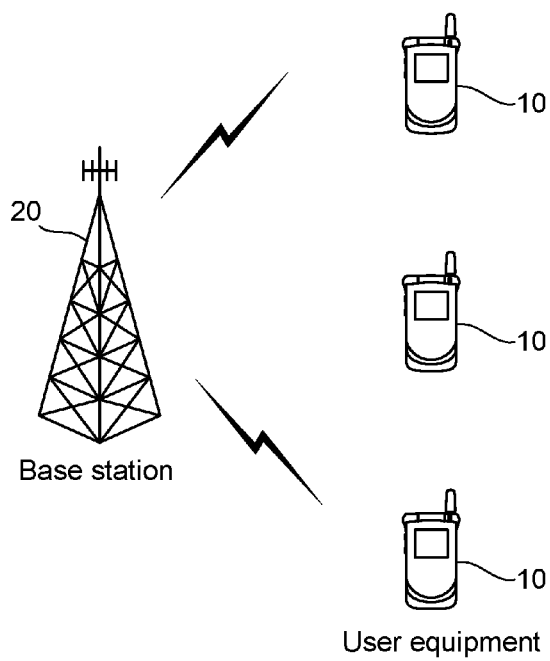
FIG. 1 is a block diagram showing a wireless communication system.

FIG. 1 is a block diagram showing a wireless communication system. The wireless communication system is widely deployed to provide a variety of communication services such as voices, packet data, and the like.

Referring to FIG. 1, the wireless communication system comprises UEs (user equipments) 10 and a BS (base station) 20. A user equipment 10 can be fixed or mobile and referred to as another terminology, such as a mobile station (MS), a user terminal (UT), a subscriber station (SS), a wireless device, or the like. Generally, the base station 20 is a fixed station communicating with the user equipment 10, which can be referred to as another terminology, such as a node-B, base transceiver system (BTS), access point, or the like. There are one or more cells within the coverage of a base station 20.

Hereinafter, downlink means communication from the base station 20 to the user equipment 10, and uplink means communication from the user equipment 10 to the base station 20. In the downlink, a transmitter may be a part of base station 20, and a receiver may be a part of the user equipment 10. In the uplink, the transmitter may be a part of the user equipment 10, and the receiver may be a part of the base station 20.

Figure 2:
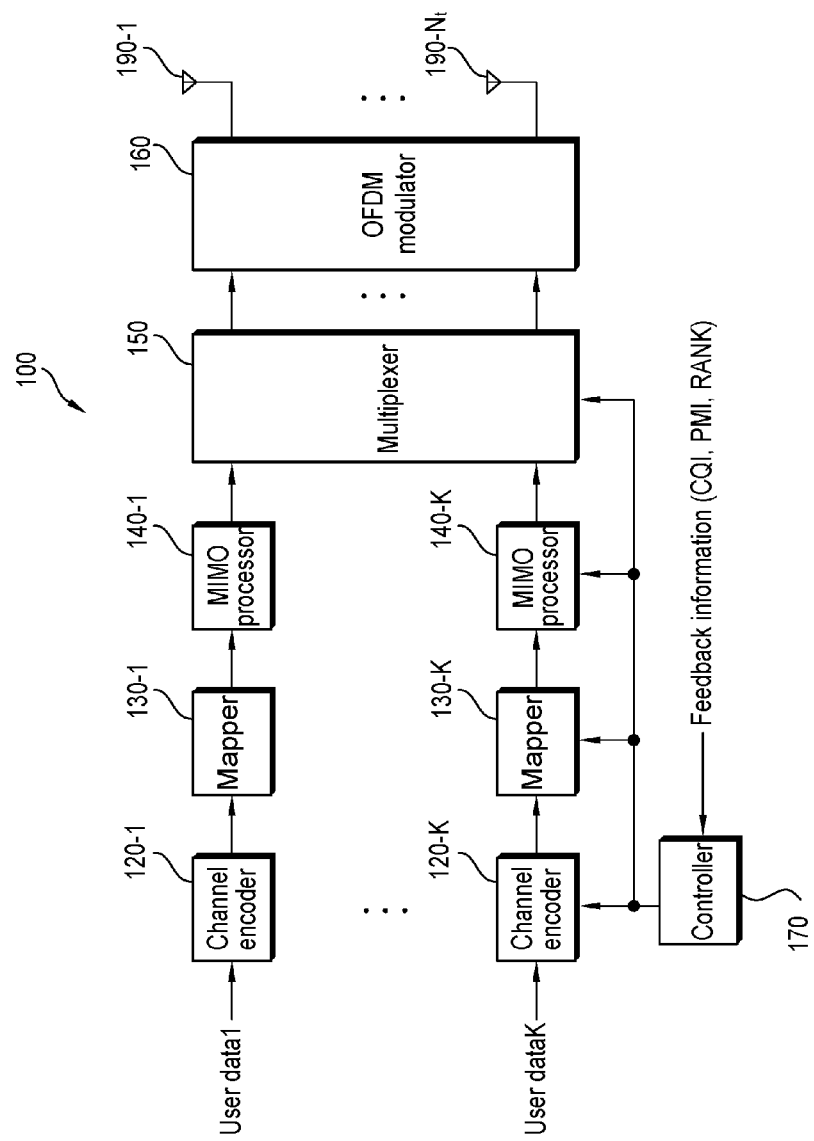
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes channel encoders 120-1 to 120-K, mappers 130-1 to 130-K, MIMO processors 140-1 to 140-K, and a multiplexer 150. The transmitter 100 also comprises Nt (Nt>1) transmit antennas 190-1 to 190-Nt.

Each of the channel encoders 120-1 to 120-K encodes inputted user data in a predetermined coding scheme and forms coded data. Each of the mappers 130-1 to 130-K maps the coded data to a symbol representing a location on a signal constellation. Any kind of modulation scheme may be used, including m-PSK (m-Phase Shift Keying) and m-QAM (m-Quadrature Amplitude Modulation). For example, the m-PSK may be BPSK, QPSK, or 8-PSK. The m-QAM may be 16-QAM, 64-QAM, or 256-QAM.

The MIMO processors 140-1 to 140-K process input symbols in a MIMO method according to the multiple transmit antennas 190-1 to 190-K. For example, the MIMO processors 140-1 to 140-K may use codebook-based precoding and perform precoding according to PMI received from the controller 170. The PMI is an index of a precoding matrix or a precoding vector contained in the codebook.

The multiplexer 150 assigns the input symbols $x_1, \ldots, x_k$ to appropriate subcarriers and multiplexes the symbols for a user. The OFDM modulator 160 OFDM modulates the input symbols and outputs OFDM symbols. The OFDM modulator 160 may perform IFFT on the input symbols and further insert a cyclic prefix (CP) after performing the IFFT. The OFDM symbols are transmitted through respective transmit antennas 190-a to 190-Nt.

The controller 170 reads CQI, PMI, and rank from feedback information and sends them to the channel encoders 120-1 to 120-K, mappers 130-1 to 130-K, and MIMO processors 140-1 to 140-K.

Figure 3:
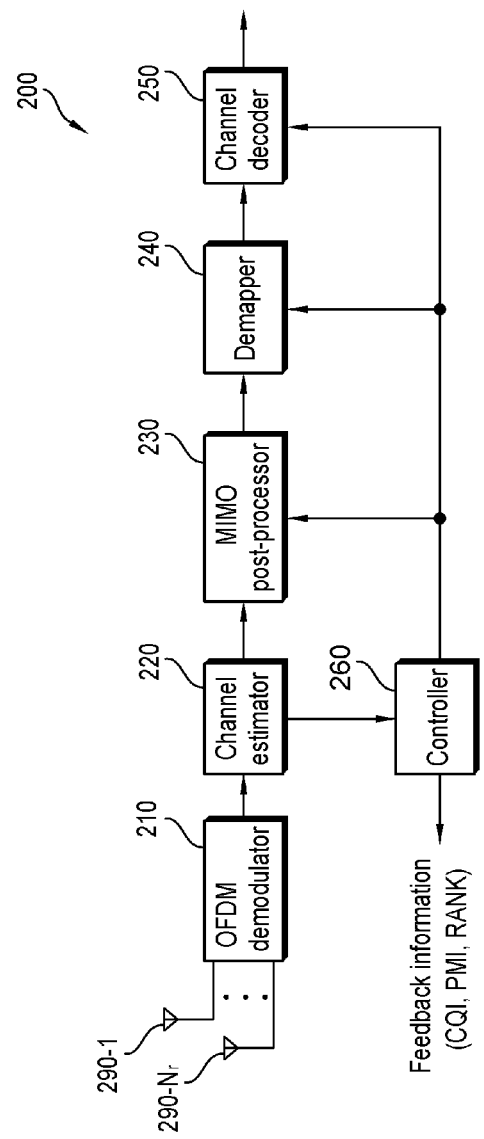
FIG. 3 is a block diagram showing a receiver according to an embodiment of the present invention.

FIG. 3 is a block diagram showing a receiver according to an embodiment of the present invention.

Referring to FIG. 3, a receiver 200 includes an OFDM demodulator 210, a demapper 240, a channel decoder 250, and a controller 260. Although FIG. 3 shows one receiver 200, a plurality of receivers 200 may be arranged in a system.

The OFDM demodulator 210 performs FFT on signals received through receive antennas 290-1 to 290-Nr. A channel estimator 220 estimates a channel, and a MIMO post-processor 230 performs post-processing corresponding to the MIMO processors 140-1 to 140-K. The demapper demaps input symbols to coded data, and the channel decoder 250 decodes the coded data and restores original data. The controller 260 creates appropriate feedback information and feeds back the feedback information to the transmitter 100 on the estimated channel or the like. The feedback information transmitted from the receiver 200 to the transmitter 100 may include CQI, PMI, and rank.

The CQI, rank, and PMI, which are control signals needed to operate a MIMO system, is determined by the receiver and fed back to the transmitter. Granularity for transmitting the control signals should be determined in a time and/or a frequency domain. Ideally, optimal performance may be obtained if the control signal is transmitted at a granularity of a minimum unit. However, since there is a burden imposed by transmitting a large amount of control signals, it is important to reduce the amount of fed back control signals while minimizing performance degradation.

Figure 4:
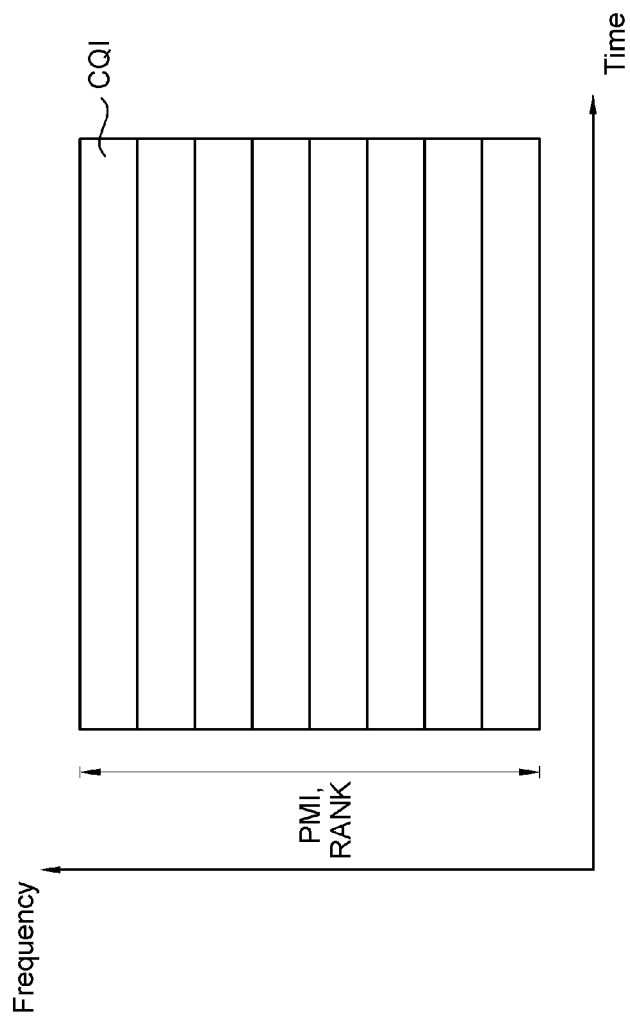
FIG. 4 illustrates a method of transmitting feedback information according to an embodiment of the present invention.

FIG. 4 illustrates a method of transmitting feedback information according to an embodiment of the present invention.

Referring to FIG. 4, a whole frequency band is divided into a plurality of subbands, and CQI is transmitted for each of the subbands. The whole frequency band may correspond to system bandwidth. A subband includes at least one subcarrier and is a unit for reporting or calculating CQI. Here, although the whole frequency band is divided into eight subbands of equal width, it is not a limit, but the number and width of the subbands may be diversely modified.

A PMI and a rank are transmitted in a frequency band wider than that of the CQI or in the whole frequency band. That is, a frequency band for transmitting the PMI and rank (a second frequency band) is set to be wider than a frequency band for transmitting the CQI (a first frequency band). The second frequency band may include larger number of subbands than the first frequency band. The CQI is calculated based on the rank and the PMI.

Although the CQI is reported by the unit of subband, performance degradation is not so serious compared with reporting CQI for each subcarrier. Although one rank is reported on the whole frequency band, performance degradation almost does not occur. In addition, although one PMI is reported for the wider frequency band than CQI, performance degradation may not be so high except in some environments. Since the transmission amount of PMI information almost corresponds to the transmission amount of CQI information, although there is performance degradation in some environments, it may be preferable to transmit only one PMI for the whole frequency band considering overhead incurred by transmission of feedback information. Accordingly, MIMO control signals (rank and PMI) are reported by the frequency allocation unit larger than CQI to reduce the amount of feedback information.

When the number of the subbands is too large to transmit the CQI for each subband, CQI for at least one selected subband over all subbands can be transmitted. Alternatively, after all subbands are grouped into at least one subset, CQI for each subset or CQI for at least one selected subband in the subset can be transmitted.

If the feedback information is transmitted on an uplink control channel, CQI for each subband over all subbands cannot be simultaneously transmitted due to limited radio resources of the uplink control channel. To reduce amount of feedback information transmitted on the uplink control channel, the CQI for each subset or CQI for at least one selected subband in the subset can be transmitted.

The PMI and the rank may be simultaneously or separately transmitted. The PMI and the rank may be separately channel-encoded and transmitted. Or, the PMI and the rank may be channel-encoded and transmitted together. Block coding, well-known convolutional coding, turbo coding and the like may be used as the channel encoding.

Figure 5:
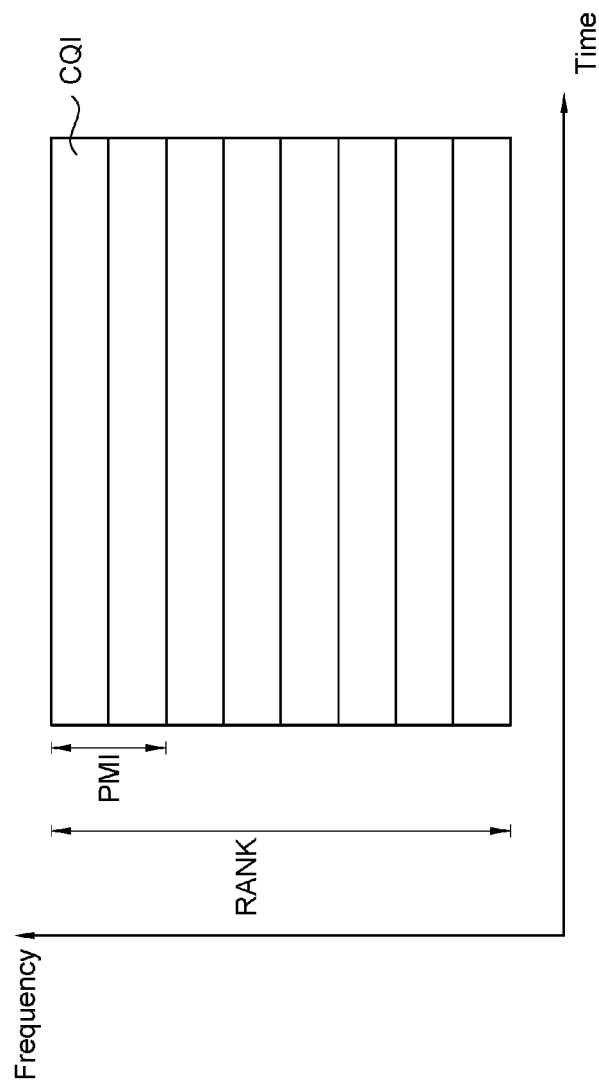
FIG. 5 illustrates a method of transmitting feedback information according to another embodiment of the present invention.

FIG. 5 illustrates a method of transmitting feedback information according to another embodiment of the present invention.

Referring to FIG. 5, a whole band is divided into a plurality of subbands on the frequency domain, and a CQI is transmitted for each of the subbands or for at least one selected subband from the plurality of subbands. A PMI is transmitted in a frequency band equal or wider than the CQI. Although the PMI is transmitted in every two subbands here, it is not a limit, but a frequency band for transmitting PMI may include at least one subband. The rank is transmitted in a frequency band wider than the PMI or in the whole frequency band.

Frequency bands are extended in order of the frequency band of a CQI (a first frequency band), frequency band of a PMI (a second frequency band) and frequency band of a rank (a third frequency band). The second frequency band may be a multiple of the first frequency band and the third frequency band may be a multiple of the second frequency band.

Figure 6:
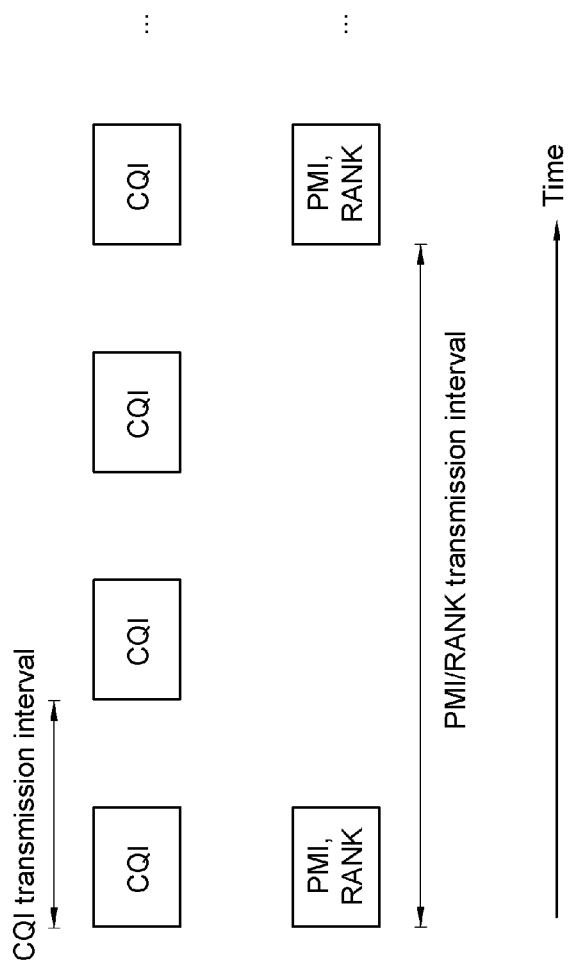
FIG. 6 illustrates a method of transmitting feedback information according to still another embodiment of the present invention.

FIG. 6 illustrates a method of transmitting feedback information according to still another embodiment of the present invention.

Referring to FIG. 6, a CQI is transmitted at a CQI transmission interval (a first transmission interval), and PMI and rank are transmitted at a PMI and rank transmission interval (a second transmission interval). The PMI and rank transmission interval is equal to or longer than the CQI transmission interval. The CQI can be transmitted more frequently than the PMI and rank. Here, it is illustrated that the transmission interval of the CQI is three times shorter than that of the PMI and rank, but it is merely an exemplary illustration.

System performance is differently affected by the transmission interval of CQI and the transmission interval of rank and PMI. Degradation of system performance is lowered as the transmission interval of CQI is shorter like in the frequency domain, whereas degradation of system performance is not so high although the rank and PMI has a relatively longer transmission interval.

Figure 7:
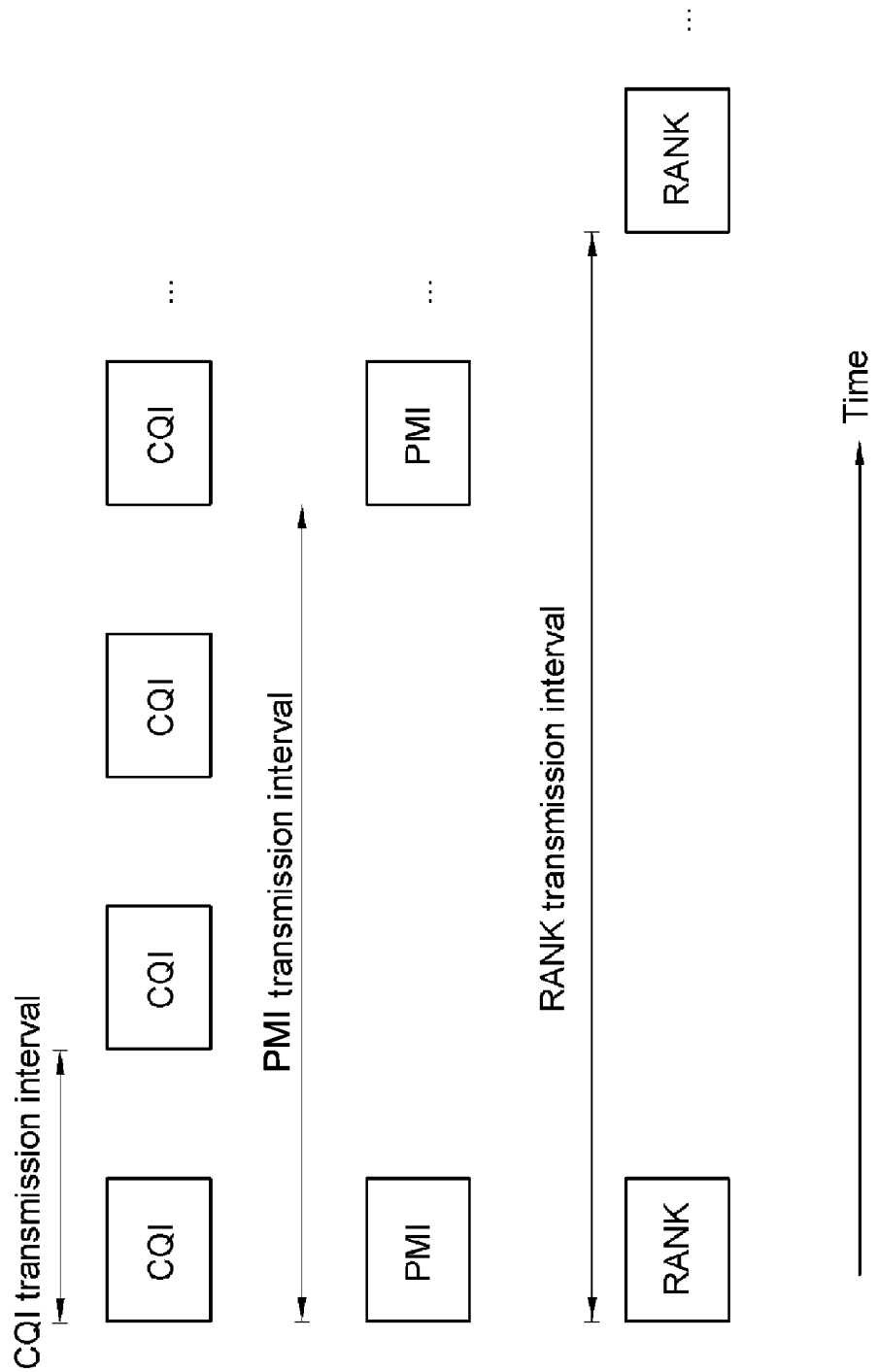
FIG. 7 illustrates a method of transmitting feedback information according to still another embodiment of the present invention.

FIG. 7 illustrates a method of transmitting feedback information according to still another embodiment of the present invention.

Referring to FIG. 7, a CQI is transmitted at CQI transmission intervals (a first transmission interval), a PMI is transmitted at PMI transmission intervals (a second transmission interval), and a rank is transmitted at rank transmission intervals (a third transmission interval). The CQI transmission interval is equal to or shorter than the PMI transmission interval, and the PMI transmission interval is shorter than the rank transmission interval. The CQI can be transmitted more frequently than the PMI, and the PMI can be transmitted more frequently than the rank.

Although a PMI is determined on a whole band, a CQI can be determined on a subset of the whole band. The CQI may be calculated assuming the use of a precoding matrix indicated by PMI on the a subset of the whole band. The CQI has a value reflecting transmission over at least one selected subband of the subset. The CQI on each respective subset can be transmitted at CQI transmission interval.

Transmission intervals can be longer in order of CQI, PMI and rank. It is because the rank may be less sensitive than the PMI in the time domain. The CQI transmission interval may be M (M≥1) times the PMI transmission interval and the PMI transmission interval may be N (N≥1) times the rank transmission interval.

Figure 8:
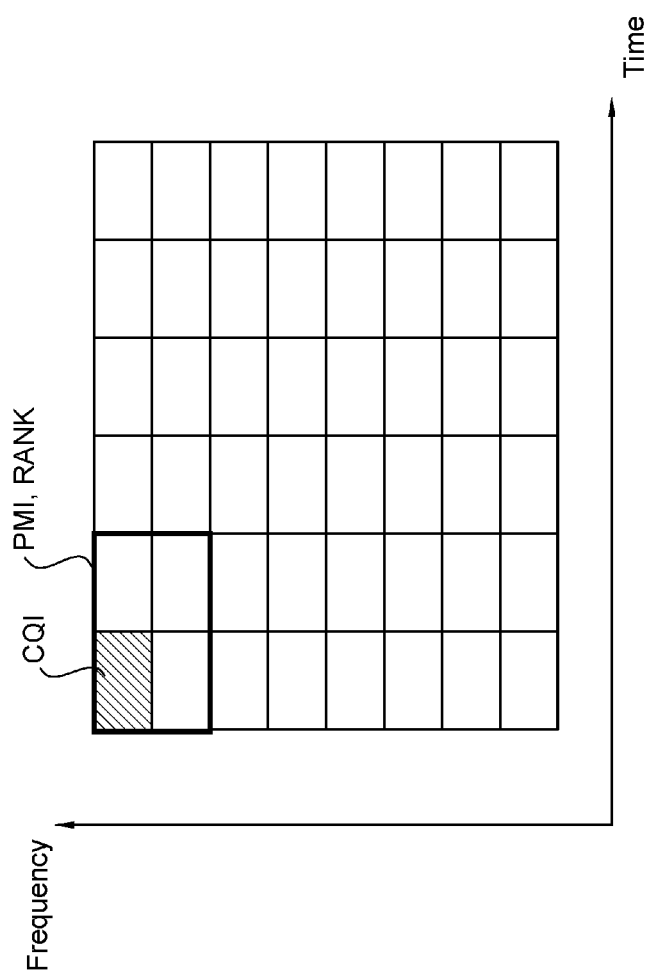
FIG. 8 illustrates a method of transmitting feedback information according to still another embodiment of the present invention.

FIG. 8 illustrates a method of transmitting feedback information according to still another embodiment of the present invention.

Referring to FIG. 8, a CQI is transmitted in the time and frequency domains. When an allocation unit for transmitting CQI in the time and frequency domains is a CQI allocation unit (the portion of slanted lines), the PMI and rank have an allocation unit larger than the CQI allocation unit in the time and/or frequency domain. Here, although it is shown that the PMI and rank has an allocation unit corresponding to four CQI allocation units, it is merely an example.

That is, the PMI and rank may have a frequency band larger than that of the CQI in the frequency domain and a region larger than that of CQI in the time domain.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting feedback information in a wireless communication system, the method comprising:
    dividing, by a user equipment (UE), a whole frequency band of a downlink channel into a plurality of subbands;
    determining, by the UE, a channel quality indicator (CQI) frequency band, a precoding matrix indicator (PMI) frequency band, and a RANK frequency band, the CQI frequency band including M subbands among the plurality of subbands, the PMI frequency band including N subbands, the RANK frequency band including K subbands among the plurality of subbands, M, N, and K being positive integers, N being larger than M, and K being larger than N,
    wherein N is a multiple integer number of M, and K is a multiple integer number of N;
    calculating, by the UE, a CQI for the CQI frequency band assuming a use of the precoding matrix indicated by the PMI on the PMI frequency band of the whole frequency band,
    wherein the CQI has a value reflecting transmission over the CQI frequency band;
    allocating, by the UE, a CQI allocation unit for transmitting the CQI for the CQI frequency band;
    allocating, by the UE, a PMI allocation unit for transmitting the PMI for the PMI frequency band;
    allocating, by the UE, a RANK allocation unit for transmitting the RANK for the RANK frequency band;
    transmitting, by the UE, the CQI for the CQI frequency band via the CQI allocation unit;
    transmitting, by the UE, the PMI for the PMI frequency band via the PMI allocation unit; and
    transmitting, by the UE, the RANK for the RANK frequency band via the RANK allocation unit,
    wherein a CQI transmission interval is shorter than a PMI transmission interval, and the PMI transmission interval is shorter than a RANK transmission interval.

2. The method of claim 1,
    wherein the CQI for the CQI frequency band and the PMI for the PMI frequency band are transmitted in a single uplink channel, and
    wherein the CQI allocation unit and the PMI allocation unit are included in the single uplink channel.

3. The method of claim 2, wherein the CQI for the CQI frequency band and the PMI for the PMI frequency band are aperiodically transmitted.

4. The method of claim 1, wherein the CQI for the CQI frequency band and the PMI for the PMI frequency band are periodically transmitted.

5. A wireless apparatus comprising:
    a radio frequency unit transmitting and receiving a radio signal; and
    a processor operatively coupled to the radio frequency unit, wherein the processor is configured for,
    dividing a whole frequency band of a downlink channel into a plurality of subbands,
    determining a channel quality indicator (CQI) frequency band, a precoding matrix indicator (PMI) frequency band, and a RANK frequency band, the CQI frequency band including M subbands among the plurality of subbands, the PMI frequency band including N subbands, the RANK frequency band including K subbands among the plurality of subbands, M, N and K being positive integers, N being larger than the M, and K being larger than N,
    wherein N is a multiple integer number of M, and K is a multiple integer number of N;
    calculating a CQI for the CQI frequency band assuming a use of the precoding matrix indicated by the PMI on the PMI frequency band of the whole frequency band,
    wherein the CQI has a value reflecting transmission over the CQI frequency band;
    allocating a CQI allocation unit for transmitting the CQI for the CQI frequency band;
    allocating a PMI allocation unit for transmitting the PMI for the PMI frequency band;
    allocating, by the UE, a RANK allocation unit for transmitting the RANK for the RANK frequency band;
    transmitting the CQI for the CQI frequency band via the CQI allocation unit;
    transmitting the PMI for the PMI frequency band via the PMI allocation unit, and
    transmitting, by the UE, the RANK for the RANK frequency band via the RANK allocation unit,
    wherein a CQI transmission interval is shorter than a PMI transmission interval, and the PMI transmission interval is shorter than a RANK transmission interval.

* * * * *